United States Patent [19]
Power

[11] Patent Number: 5,995,223
[45] Date of Patent: Nov. 30, 1999

[54] APPARATUS FOR RAPID PHASE IMAGING INTERFEROMETRY AND METHOD THEREFOR

[76] Inventor: Joan Fleurette Power, 1100, Dr. Penfield, #822, Montreal, Quebec, Canada, H3A 1A8

[21] Appl. No.: 09/087,967

[22] Filed: Jun. 1, 1998

[51] Int. Cl.$^6$ .................................................... G01B 9/02
[52] U.S. Cl. .......................................... 356/351; 356/349
[58] Field of Search .................................. 356/351, 349, 356/360

[56] References Cited

U.S. PATENT DOCUMENTS 5,365,065  11/1994  Power .
5,619,325   4/1997  Yoshida .................................. 356/351

OTHER PUBLICATIONS

R. Smythe / R. Moore, Instantaneous phase measuring interferometry Optical Engineering 23(4), 361–364, Jul., 1984.

D.–C. Su, L. –H. Shyu "A new type of polarization phase shifter for phase shifting interferometry" Optik 90, No. 2 (1992) 53–56, May 6, 1991.

*Primary Examiner*—Robert H. Kim
*Attorney, Agent, or Firm*—F. Martineau

[57] ABSTRACT

The apparatus performs phase imaging interferometry on a test medium with spatially varying optical length. The apparatus uses a polarization based phase shift element in either the probe or reference arm of the interferometer to simultaneously generate both the conventional in-phase spatial interferogram of the test medium, and a quadrature interferogram which is ninety degrees out of phase with the conventional interferogram at all image positions, allowing a reconstruction of the test medium's interferometric phase image over 0 to $2\pi$ radians. In contrast to the prior art, the present invention accomplishes the phase shifting operation in a single interferometer stage, using a polarizing beam splitter which accomplishes polarized seggregation of the interferometer output beam. The apparatus has high resistance to vibrations, instability and misalignment errors.

17 Claims, 3 Drawing Sheets

APPARATUS FOR RAPID PHASE IMAGING INTERFEROMETRY AND METHOD THEREFOR

FIELD OF THE INVENTION

The invention relates to optical imaging devices, and more particularly to an apparatus for rapid phase imaging interferometry and to the method therefor.

BACKGROUND OF THE INVENTION

Optical length measurements, made by interferometry, are highly sensitive and adaptable to the study of a wide range of physical phenomena because they sensitively measure small induced changes in the optical length of a material medium, of the order of a fraction of an optical wavelength.

A number of physical and chemical phenomena may account for a spatial variation in the optical length of a condensed phase material, which may be interferometrically probed under appropriate conditions. Two and three dimensional variations in the surface topography of a material result in thickness (and therefore optical length) variations on the order of one or more optical wavelengths, which may be spatially imaged by interferometry. Two and three dimensional variations in the chemical composition or physical micro-structure of a material may produce both spatially distributed thickness variations and spatial variations in the index of refraction. All of these effects may be probed under suitable conditions, and, potentially, imaged in two dimensions by interferometry.

In addition to the static or intrinsically occurring spatial variations in the optical length of a material, additional optical length variations may be induced in a material in the presence of externally applied perturbations. A number of physical and chemical phenomena provide mechanisms for inducing spatially distributed changes in the optical length of a condensed phase material, which may then be interferometrically probed. Such mechanisms could include thermal or electromagnetic excitation, or acoustic or mechanical perturbation of the material. When interferometry is used to record images of the optical length changes induced in a material by such applied external perturbations, it may provide a method of imaging the thermal, acoustic, optical or topographic properties of the material, depending on the nature of the externally applied perturbation.

Because of the many physical and chemical phenomena which are capable of producing optical length changes in a material, which interferometry may potentially probe with very high optical length resolution, imaging methods based on interferometry have widespread applications in industrial measurement. Some examples include interferometric imaging of materials or structures excited using thermal energy, ultrasonic waves, or mechanical vibrations.

When a material sample is subjected to a perturbation such as one of the above-mentioned perturbations, any resulting changes in the material optical length may be potentially sensed by an interferometer. Optical length variations occurring along the transverse coordinates of the interferometer may be probed to form an interferometric image: the transverse coordinates of the interferometer, which are also the image coordinates of the phase image, are defined as occupying orthogonal directions, namely (x,y), which lie in the plane perpendicular to the probe beam axis of optical propagation (the "z" axis), which will be defined hereinafter. The primary interferometric image produced by the interferometer is called a spatial interferogram. The spatial interferogram is defined as an image formed by the superposition of the probe and reference beams in the exit pupil plane of the interferometer or in a plane conjugate to the exit pupil plane, with the aperture stop of the interferometer assumed to be located at the test medium. The spatial interferogram is recorded by a camera, which is considered to be a generalized imaging device composed of an array of optical sensing elements (or image pixels) operating over the wavelength range used by the interferometer beams, and the information is stored in a a data storing and processing system, e.g. a computer.

Known interferometric phase imaging apparatuses generally consist of a phase imaging interferometer and an external imaging system, the latter briefly described above. The interferometer stage consists of the following elements:

a) a radiation source normally containing a band of wavelengths lying in the ultraviolet to the far infrared (shorter wavelengths such as x-rays or longer wavelengths such as those pertaining to microwave and radio-frequency fields are not excluded in principle); the radiation source emits a source beam having a spatial coherence length of 10–100 cycles or greater of the radiation at all wavelengths;

b) an input plane or surface at which the source beam is separated (by partial reflection or other means) into one (or more) probe beam which propagates along a path called the probe arm of the interferometer, and one (or more) reference beam which is phase coherent with the probe beam and which propagates along a path called the reference arm of the interferometer;

c) a material medium, on which property measurement is accomplished by means of the interferometry apparatus; the material medium is also called the test medium, and is intersected by the probe beam which experiences a one, two or three dimensional spatial variation in optical phase shift with respect to the coordinates (x,y) and z; and d) an output plane or surface in which the probe and reference beams are superimposed so as to produce electromagnetic wave interference, thus forming an output beam.

Other external components with which the interferometer is equipped include: a set of image transfer elements such as lenses, mirrors or other beam directing elements, operating over the wavelength range of the interferometer, where the set of image transfer elements transfer an image of the wave interference occurring in the interferometer exit pupil plane to the imaging device or camera consisting of an array of radiation intensity sensing elements. If negligible diffraction or refraction occurs between the test medium and the output plane (as is usually the case), an image of the interference at the output plane provides a good approximation to the image observed in the exit pupil plane and the imaging system may have as its object plane the output plane of the interferometer (or points in the neighborhood thereof).

It will be assumed that the probe and reference beams have spatial coherence over a length of at least 10 cycles at each wavelength in the interferometer's wavelength range. Within the beam spatial coherence length, said beam propagates with wavefronts of deterministic phase dependence, which obey the laws of coherent scalar wave propagation theory.

In practice, through the use of lasers as the radiation source, which is common in interferometry, a coherence length on the order of centimeters to meters is readily obtainable. Hence the probe and reference beams often behave as though they were completely spatially coherent over distances which are large relative to the probe and reference beam path lengths in the interferometer, when laser sources are used. This is the usual condition assumed for the description of probe and reference beam propagation in the present specification.

In many cases, both the probe and reference beams propagating in the interferometer will have nearly flat phase fronts, and will propagate approximately as plane waves. This means that the divergence or convergence of the beams in the interferometer will be small in these cases. Such a beam has a well defined axis of propagation which is seen to be oriented in the direction colinear to the surface normal of the beam front at the central axis of the beam. The central axis of such a beam will spatially coincide with the centroid of the optical intensity distribution, as averaged in a direction along the beam's wavefront or wavefronts. These transverse orthogonal coordinate directions are assigned the notations x and y. It is normally desirable for the probe and reference beams, when superimposed at the output plane, to have nearly flat wave fronts, where any transverse length displacements of the probe wave front arising from phase shifts imparted by the test medium are of the order of the probe beam wavelengths.

In the generalized phase imaging interferometer it is normally desirable that probe and reference beams have phase fronts which are flat or slowly varying along the x and y directions. This flatness is a desirable property for the probe and reference beams forming an interferogram at the output plane or surface. If the probe and reference beams have large intrinsic phase front curvatures at the output surface, the spatial interferogram may become highly sensitive to small displacements in the transverse coordinates of central axis positions of the superimposed probe and reference beams. Hence the output surface is usually chosen to be planar to a good approximation, and in the discussion hereinafter, the term output plane, is used in preference to output surface. It is also usually desirable for the source beam arriving at the input plane to be flat. If the radiation produced by a given source is not collimated, a set of optional beam collimating components may be located in the source beam path between the radiation source and the input plane of the interferometer, to insure adequate phase front flatness of the probe and reference beams propagating in the interferometer.

As known to the person skilled in the art, the purpose of an imaging interferometer is to measure optical length variations in the test medium, which may be obtained by mathematically processing the experimental results retrieved by the imaging system. The experimental result that must be obtained is the phase variation in the probe beam $\Delta\phi(x,y)$, which may be determined through the interferograms formed with the probe and reference beams.

The test medium optical length variation may be intrinsic to the medium, or may be induced as the result of a perturbation mechanism. There are three possible means by which the interferometer may probe the phase distribution in the test medium (TM): (i) by propagation of the probe beam through the test medium with full (greater than 99%) or partial optical transmission of the probe beam by the medium; (ii) by full (greater than 99%) or partial reflection of the probe beam at a surface of the test medium;(iii) some combination of full or partial reflection at a surface of the TM with full or partial transmission by the constituent medium or media comprising said TM. In the case where the test medium is composed of an inhomogeneous assembly of contiguous layers of media, reflection may occur at one or possibly more of the interfaces contained in such an assembly.

The relationship between the radiation phase shift measured by an interferometer and the measured spatial interferogram must next be examined. The equations given hereinafter pertain to a generalized phase imaging interferometer equipped with a highly spatially coherent source such as that supplied by a laser.

Assuming that the probe and reference beams are highly collimated in a generalized phase imaging interferometer, under the above conditions, a cosine or "corrected in-phase" interferogram may be obtained through equation (1), $$\cos(\Delta\phi_c(x, y)) = \frac{I(x, y) - (I_r(x, y) + I_p(x, y))}{2\sqrt{I_r(x, y)I_p(x, y)}} \qquad (1)$$

in which:

$\Delta\phi_c(x, y)$ is the interferometric phase difference between the interferometer probe and reference beams, since the probe and reference beams originate from a same source beam and assuming nearly flat phase fronts with the condition of good matching of the probe and reference beam central axes;

$I(x,y)$ is the output beam intensity (the "in-phase" interferogram), as measured on the interferogram by means of the imaging system, as an array of pixels having individual intensities and each having corresponding respective transverse coordinates (x,y);

$I_r(x,y)$ is the reference beam intensity, as measured independently while the probe beam is optically sealed with a suitable shutter; and $I_p(x,y)$ is the probe beam intensity, as measured independently while the reference beam is optically sealed with a suitable shutter.

Thus, the first step in any phase reconstruction method is a linear recording of the intensity interferograms $I(x,y)$, $I_r(x,y)$ and $I_p(x,y)$ by an imaging device, in which the output beam intensity distribution incident on the sensing elements of the camera is sampled as a two dimensional array of picture elements or pixels, where the camera signal generated at an individual pixel is linearly proportional to the integral light intensity over that pixel's area. The recovery of $\Delta\phi_c(x,y)$ from interferograms measured by the interferometer is termed "phase reconstruction". Once the images of the probe beam intensity, of the reference beam intensity and of the interfering beams intensity are captured, they are mathematically processed through equation (1), for recovering the optical phase difference over the interval from 0 to $\pi$ radians. The inverse cosine function cannot recover negative values of the phase argument, however, and two quadrants of angular correction, from $\pi$ to $2\pi$, cannot be accurately reconstructed from the cosine interferogram alone. Note that in the absence of mutual interference, the probe and reference beam intensity images are highly stable over relatively long periods of time, and need not be recorded in rapid succession with the interferogram.

For phase reconstruction over the full angular interval from 0 to $2\pi$ radians, a quadrature component of the cosine interferogram, namely + or $-\sin(\Delta\phi_c(x,y))$, must be recovered in addition to the cosine interferogram. Such a quadrature component would have a value of the optical phase which is a constant ninety degrees greater or less, at all transverse spatial (x,y) positions, than$\Delta\phi_c(x,y)$, the intrinsic interferometric phase.

The quadrature component of the corrected spatial interferogram may be recovered experimentally by measuring a so-called quadrature interferogram. The quadrature interferogram can be recovered by physically imposing a precise positive or negative 90 degree optical phase offset between the probe and reference beams at all (x,y) coordinate positions, over and above the intrinsic interferometric phase, $\Delta\phi_c(x,y)$, existing between probe and reference beams. This imposed differential phase offset must be applied precisely, without any significant error, over all of the interferometric transverse coordinates. The positive quadrature interferogram is given the notation $I_q$ (x,y), and yields a sine interferogram expression as in equation (2).

$$\sin(\Delta\phi_c(x, y)) = \frac{I_q(x, y) - (I_r(x, y) + I_p(x, y))}{2\sqrt{I_r(x, y)I_p(x, y)}} \quad (2)$$

It is also experimentally possible to generate a so called negative quadrature interferogram, which is mathematically expressed similarly to equation (2), but then the negative sine interferogram $(-\sin(\Delta\phi_c))$ will be recovered. The negative quadrature interferogram is recovered by physically adding a precise $-\pi/2$ radians phase value to the interferometric phase, $\Delta\phi_c(x,y)$, between the probe and reference beams, where the probe beam lags the reference beam by $\pi/2$ radians, at all transverse spatial positions in the interferogram.

A recovery of $\Delta\phi_c(x,y)$ may be made with good accuracy from the corrected interferogram data by computing:

$$\Delta\phi_c = \arctan\left[\frac{\sin(\Delta\phi_0(x, y))}{\cos(\Delta\phi_c)}\right] \quad (3)$$

when $|\sin(\Delta\phi_c)| \leq \cos|(\Delta\phi_c)|$ and:

$$\Delta\phi_c = \text{arccot}\left[\frac{\cos(\Delta\phi_0(x, y))}{\sin(\Delta\phi_c)}\right] \quad (4)$$

when $|\cos(\Delta\phi_c)| \leq |\sin(\Delta\phi_c)|$.

Phase reconstructions may thus be made over all four Cartesian quadrants by consideration of the signs of the corresponding pairs of sine and cosine terms in equations (3) and (4).

If one measures the negative quadrature interferogram instead of the positive quadrature interferogram, the equations (1) to the cosine interferogram and (2) as modified to the negative sine interferogram $(-\sin(\Delta\phi_c))$, will then reconstruct the negative of the interferometric phase. Hence, a recording of either the positive or negative quadrature interferogram will enable recovery of the interferometric phase image. The term quadrature interferogram thus refers equally to either a positive quadrature or negative quadrature interferogram.

In advanced applications of interferometric imaging, an externally applied perturbation (such as heating, acoustic perturbation, etc.) causes a change in the transverse optical length distribution of the test medium. If any significant deviations from uniformity of the optical phase fronts are contributed by imperfections in the optical components placed in the probe or reference beam, a background phase image contribution will be produced which is additive with the phase image from the test medium. Together, these background image contributions sum to produce a phase image, $\Delta\phi_c(x,y)_{unperturbed}$, is desired, in such a case, to measure images of the applied perturbation independently of any intrinsic optical length variations existing in the material in the absence of said applied perturbation.

To accomplish this, a first phase image $\Delta\phi_c(x,y)_{unperturbed}$ is computed as described above and expressed in equations (3) and (4) from the interferometric image without any external perturbation, and is then subtracted from a second phase image $\Delta\phi_c(x,y)_{perturbed}$ computed from equations (3) and (4) while the test medium is being subjected to an external perturbation.

Many established interferometric imaging methods require the recovery of the phase image of an externally perturbed test medium for a complete physical interpretation of the image formation process in a material, obtained through the differential measurement explained hereinabove.

Any method which reconstructs the interferometric phase image, especially when such a method is applied for the purposes of differential image subtraction as when external perturbation on the test medium is present, must be stable, accurate and rapid. Speed of measurement is especially desirable for two reasons. First, the perturbation applied to the test medium may be transient and the requirement for obtaining information at high speed may be essential. If the perturbation consists of an ultrasonic pulse applied to the sample, a measurement time of microseconds or less may be appropriate, for example. Second, the interferometer has high sensitivity to small optical and/or geometric displacements. In the differential measurement described hereinabove, the measurement of the phase images $\Delta\phi_c(x,y)_{perturbed}$ and $\Delta\phi_c(x,y)_{unperturbed}$ occur under conditions of precisely matched optical alignment. If the interferometer optical paths drift or displace between these image recordings, the differential measurement will be invalidated. Consequently, the shorter the interval of measurement between $\Delta\phi_c(x,y)_{perturbed}$ and $\Delta\phi_c(x,y)_{unperturbed}$ required by a given method, the higher the fidelity of the differential phase reconstruction made by that method.

The consideration of stability of the methods used to reconstruct $\Delta\phi_c(x,y)_{perturbed}$ and $\Delta\phi_c(x,y)_{unperturbed}$ in a differential subtraction scheme is also of paramount importance. Stability in this context is the degree to which the alignment geometry of the interferometer is preserved during the measurements of all spatial interferograms, and more particularly during the measurements of in-phase and quadrature interferograms. A resettable phase reconstruction method is one in which the optical alignment of the interferometer which produced the in-phase interferogram may be precisely restored after the quadrature interferogram is recorded. Finally, an accurate phase reconstruction measurement is one in which the measured quadrature interferogram has a highly uniform optical phase offset from the in-phase interferogram over all points of the image field, (x,y), where said phase offset absolute value is very close to $\pi/2$ radians (or some odd integral multiple thereof)

The key problem associated with a practical implementation of all interferometric phase measurement schemes is the requirement for a rapid, stable, accurate and resettable measurement of the quadrature (or conjugate quadrature) interferogram. The measurement of the quadrature interferogram, when performed correctly, requires a precise and accurate insertion of a $\pi/2$ radian optical phase offset between the probe and reference beams, over and above the inherent interferometric phase difference, $\Delta\phi_c(x,y)$. If the interferometer is supplied by a helium/neon laser, for example, this entails a physical path length displacement (in air) of +632/4 nm, as applied to either the probe arm or reference arm of the interferometer. Furthermore, this phase offset must be applied uniformly at all transverse coordinates, (x,y), as the optical path length is varied, for example, using a micropositioning apparatus.

A classical method of imposing such a phase difference between the interferometer arms is to supply a precise translation of a reflecting surface, such as that of a mirror, to increase or decrease the probe or reference arm's length, as appropriate. The translation of either the probe or reference mirror requires a precise motion to be applied, where such motion is colinear with the optical axis of the reference or probe arm of the interferometer, depending on the arm chosen to which the translation is applied. As a mirror element is displaced, all points of its surface must move with a fixed alignment precisely normal to the axis of motion. Any displacement transverse to the axis of motion introduces an error into the spatially uniform $\pi/2$ radian offset required by the quadrature interferogram, relative to the in-phase interferogram. Hence, expensive precision translation equipment must be used to apply the optical path length difference to the instrument. The optical path length must be set and reset to the values assumed by the in-phase and quadrature measurements, and this operation must be applied without slippage or decentration of the motion control apparatus. Thus,the likelihood of non-negligeable experimental errors under these conditions is high.

A standard alternative to purely mechanical motion controllers is to use a piezoelectric element in which an applied electric field across the element effects a change in the element thickness. In such a case, it is likely that there will be a difficulty in accurately calibrating the element absolute thickness change in terms of the voltage applied to the element.

Finally, another difficulty of the above methods is that there will be a time lag between the measurement of the in-phase and quadrature interferograms, which will be in the order of a few tens to a few hundreds of milliseconds for a mechanical motion controller. In this time interval the interferometer may accidentally drift or becomed mis-aligned slightly. A time lag problem remains even if a piezoelectric element is used to effect the optical path length translation.

A better method of measuring $\Delta\phi_c(x,y)$ which involves the introduction of no moving components into the interferometer, is by introduction into the reference or probe arm, of an electro-optic element which is optically transparent at the interferometer beam's wavelength. To vary the optical length of the arm into which the electro-optical element is inserted, a voltage is applied across the element, which varies the refractive index of the crystal, by an amount governed by the electro-optic coefficient of the crystal. Application of a sufficiently large potential difference across the element varies the refractive index of the crystal sufficiently to produce a $\pi/2$ phase shift in the reference arm of the interferometer. The beam propagating through the electro-optic element must be polarized along one of the principal axes of the electro-optic crystal in order to effect this phase shift, however. With this method, the electric field applied across the crystal must be stable and spatially uniform across the transverse dimensions of the reference beam. The crystal must be of a high optical purity to ensure that the electro-optical coefficient is spatially uniform for a given applied potential, across the transverse coordinates through which the beam propagates. Temperature variations might also have to be compensated depending upon the choice of electro-optical material. As with methods which use translation of the optical path, there will necessarily be a time lag between the measurement of the in-phase interferogram and the quadrature interferogram.

A phase imaging interferometer was reported in 1984 by the "Smythe and Moore" prior art reference [R. Smythe and R. Moore, "Instantaneous Phase Measuring Interferometry", Optical Engineering, 23(4), pp. 361–364 (1984)], which generates polarization isolated probe and reference beams with orthogonally aligned plane polarizations, which propagate along a pair of short physically separated paths, and are then recombined at partially reflecting surface, without mutual interference. Separate beams are then directed through separate polarizing beam splitters, for obtaining in-phase and quadrature interferograms. A more complete description of the Smythe & Moore reference apparatus will be given later, in the present specification.

For now, let us say that the Smythe/Moore interferometer apparatus forms the in-phase and quadrature interferograms in distinct spatial locations, and thus any transverse alignment difference between the in-phase and quadrature beam paths will effectively yield an error in the output data concerning the phase reconstruction. Also, the Smythe/Moore interferometer apparatus requires a minimum of four and as many as five wave plates for it to become operational; and a minimum of two and as many as three polarizing beam splitters. Thus, it is rather expensive to produce, and complex to assemble (up to five polarization axes adjustments).

OBJECTS OF THE INVENTION

It is an object of the present invention to provide an interferometer phase imaging apparatus which permits the rapid recording of all wave interference information required to construct a phase image of a test medium placed in the interferometer, and a method for reconstructing a phase image of the test medium based on the wave information recorded by the apparatus.

It is an important object of the invention to overcome all of the major measurement difficulties and limitations which are inherent to the prior art apparatuses with an interferometric phase imaging apparatus which is simple, comparatively inexpensive, robust, accurate and highly stable in the presence of accidental instrumental drifts and vibrations.

It is an object of the present invention to provide an interferometric phase imaging apparatus that measures the in-phase interferogram and quadrature interferogram simultaneously in time with very high accuracy.

SUMMARY OF THE INVENTION

I. First Apparatus

The present invention relates to an interferometric phase imaging apparatus for optically probing a suitable test medium of varying optical length, comprising:

a radiation source providing a source beam along an axis of propagation;

a polarizer for plane polarizing said source beam along a single polarizing axis lying in a plane perpendicular to said axis of propagation, thereby producing a plane polarized beam;

a first beam splitter for separating said polarized source beam into plane polarized probe and reference beams with the test medium intersecting said probe beam, having electromagnetic influence thereon;

a second beam splitter at which said probe beam and said reference beam are interferentially combined into an output beam, whereas one of either said probe beam or said reference beam, called the plane polarized component of said output beam, is polarized in a plane perpendicular to said beam axis of propagation, said plane polarized output component having an electric field vectorially composed of a first and a second electric field polar components of equal magnitude aligned orthogonal to each other along respective first and second polar axes, and where, at said second beam splitter, the other one of said probe and said reference beam, being not the plane polarized output component, called the elliptically polarized component of said output beam, has polarization being either one of circular or elliptical, in which said elliptical polarization has associated major and minor axes, and where said major and minor axes of said elliptically polarized output component align colinearly with said polar axes of said plane polarized output component, and where, at said second beam splitter, the electric field components of said probe and said reference beam which are aligned along said first polar axis interfere with each other, but distinctly of the electric field components of said probe and said reference beam which are aligned along said second polar axis;

a wave plate assembly intersecting either one of said probe or said reference beam, where so selected beam is giving rise to said elliptically polarized output component, said wave plate assembly being aligned to confer on said beam at all positions downstream of said wave plate assembly and upstream of and at said second beam splitter, either one of a state of circular polarization or of elliptical polarization, where said elliptical polarization occurs with unequal maximum electric field magnitudes projecting along major and minor axes which align along said polar axes of said plane polarized output component at said second beam splitter, thereby imposing a phase difference of $N*\pi/2$ radians where N is any signed odd integer, between the electric field component of said elliptically polarized output component at said second beam splitter aligned along said first polar axis and the electric field component of said elliptically polarized output component aligned along said second polar axis;

a single polarizing beam splitter accomplishing polarized segregation of said output beam according to alignment of electric field components of said probe and reference beams along said first and said second polar axes so as to obtain a first interferogram comprising the components of said output beam aligned along said first polar axis and a second interferogram comprising the components of said output beam aligned along said second polar axis; and image recovering means, for recovering images of said first and second interferograms.

Alternately, the radiation source and the polarizer for plane polarizing the source beam, could both be replaced by a single intrisically plane polarized laser source.

Alternately also, the single polarizing beam splitter could be cancelled, wherein the second beam splitter would itself further perform the polarized segregation of said output beam.

II. Second Apparatus

The present invention also relates to an interferometric phase imaging apparatus for optically probing a suitable test medium of optically varying length, comprising:

a radiation source providing a source beam along an axis of propagation;

a polarizer for plane polarizing said source beam along a single polarizing axis lying in a plane perpendicular to said axis of propagation;

a first beam splitter for separating said plane polarized source beam into plane polarized probe and reference beams with the test medium intersecting said probe beam, having electromagnetic influence thereon;

at least one reflective element intersecting at least either one of said probe and said reference beam, whereby said probe beam and said reference beam are redirected to said first beam splitter and are interferentially combined thereat into an output beam, whereas one of either said probe beam or said reference beam redirected to said first beam splitter, called the plane polarized component of said output beam, is plane polarized in a plane perpendicular to said beam axis of propagation, said plane polarized output component having an electric field vectorially composed of a first and a second electric field polar components of equal magnitude aligned orthogonal to each other along respective first and second polar axes, and where, at said first beam splitter, the other one of said probe and said reference beam redirected thereto, being not the plane polarized output component, is called the elliptically polarized component of said output beam, having polarization being either one of circular or elliptical, where said elliptical polarization has associated major and minor axes with unequal maximum electric field magnitudes projecting along said axes, and where said major and minor axes of said elliptical polarization align colinearly with said polar axes of said plane polarized output component, and where, at said first beam splitter, the electric field components of said redirected probe and reference beams aligned along said first polar axis interfere with each other, but distinctly of the electric field components of said redirected probe and reference beam which are along said second polar axis;

a wave plate assembly intersecting either one of said probe or said reference beam, where so selected beam is not the beam giving rise to said plane polarized output component, said wave plate assembly being aligned to confer on said beam at all positions downstream of said wave plate and upstream of and at said first beam splitter, either one of a state of circular polarization or of elliptical polarization, where said elliptical polarization occurs with unequal maximum electric field magnitudes projecting along major and minor axes which align along said polar axes of said plane polarized output component at said first beam splitter, thereby imposing a phase difference of $N*\pi/2$ radians where N is any signed odd integer, between the electric field component of said elliptically polarized output component along said first polar axis and the electric field component of said elliptically polarized output component along said second polar axis;

a single polarizing beam splitter accomplishing polarized segregation of said output beam according to alignment of electric field components of said redirected probe and reference beams along said first and said second polar axes so as to obtain a first interferogram comprising the components of said output beam aligned along said first polar axis and a second interferogram comprising the components of said output beam aligned along said second polar axis; and image recovering means, for recovering images of said first and second interferograms.

III. Method

The present invention further relates to a method for optically probing a suitable test medium of varying optical length and obtaining information about the properties thereof by recovering images of quadrature and in-phase interferograms with an interferometric phase imaging apparatus comprising a polarized radiation source, a first and second beam splitters, a polarizing beam splitter, a wave plate assembly and image recovery means, said method comprising the steps of:

a) providing a source beam polarized along an axis lying in a plane perpendicular to said beam axis of propagation;

b) splitting the beam with said first beam splitter into two distinct probe and reference beams which are substantially identical at said first beam splitter;

c) merging, at said second beam splitter said probe beam and said reference beam into at least one output beam, and maintaining, in either one of said probe or said reference beam, a state of plane polarization at said second beam splitter, in which the electric field components of said plane polarized beam at said second beam splitter are vectorially composed of a first and second polar components of equal magnitude oriented orthogonally to each other along first and second polar axes in a plane perpendicular to said probe beam axis of propagation;

d) intersecting said probe beam with the test medium and intersecting with the wave plate element a selected beam among either one of said probe or said reference beam, being not said plane polarized output beam at said second beam splitter, whereby said wave plate element confers either one of a state of circular or elliptical polarization to said selected beam at said second beam splitter, and where the major and minor axes of said elliptical polarization are aligned colinearly with said polar axes of said plane polarized output beam at said second beam splitter, thereby producing a phase difference of $N*\pi/2$ where N is any odd signed integer, between the electric field components of said probe and reference beams aligned along said first polar axis and the electric field components of said probe and reference beams aligned along said second polar axis at said second beam splitter;

e) producing at said second beam splitter interference between the components of said probe and reference beam aligned along said first polar axis and a distinct interference between the components of said probe and reference beam aligned along said second polar axis;

f) segregating said output beam according to its polarization with the polarizing beam splitter wherein the first and second polar components of said output beam will be separated so as to allow distinct interferograms to be formed, whereby a quadrature interferogram will be formed from said first polar components and an in-phase interferogram will be formed from said second polar components; and g) recovering the images of the quadrature and in-phase interferograms with the image recovering means.

DETAILED DESCRIPTION OF THE PREFERRED EMBODIMENT

Figure 1:
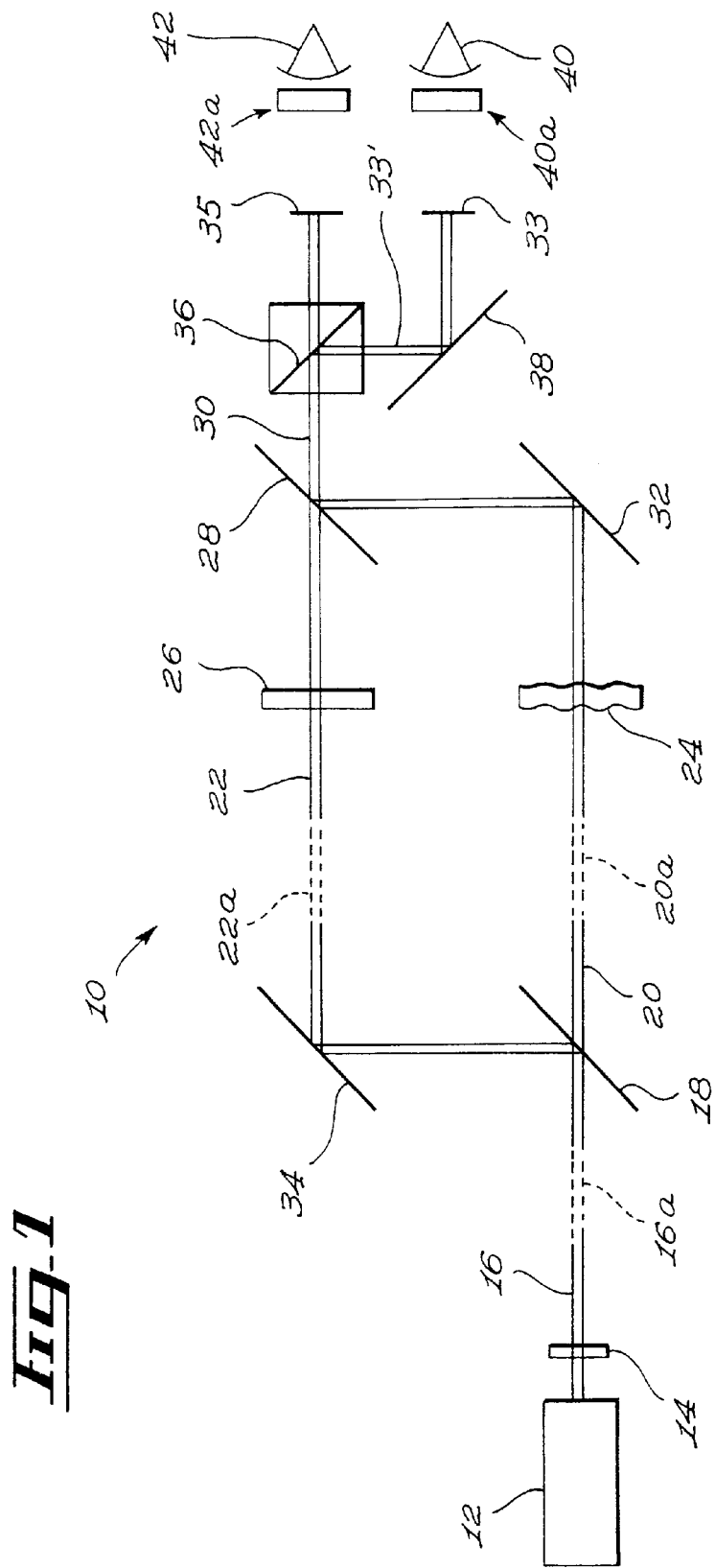
FIG. 1 schematically shows an interferometric optical phase imaging apparatus according to a preferred embodiment of the invention.

FIG. 1 schematically shows a phase imaging apparatus 10 according to the preferred embodiment of the invention, which comprises a radiation source 12 having an intrinsic or external polarizer 14. The combination of radiation source 12 and polarizer 14 supplies a collimated plane polarized source beam 16, which can be of indefinite length, as suggested by the dotted lines 16a, and which is emitted along an axis of propagation, as defined in the "Background of the Invention" section of the present specification.

For the purposes of this invention, we establish that the source radiation used by the interferometer design should have a coherence length of at least ten cycles at all source radiation frequencies. Also, it is assumed that all the elements of the phase imaging apparatus 10 of the invention operate over the wavelength range of source beam 16, as emitted by radiation source 12.

The polarization of source beam 16 is accomplished in any one selected direction in a plane perpendicular to the source beam polarization axis, according to a first and a second orthogonal electric field components or "polars" which vectorially form a polarization axis, e.g. at a $\pi/4$ radians angle between the two of them if they are of equal vectorial electromagnetic intensity, as in the preferred embodiment. For the purposes of the present text and simplicity of the description, the first polar will be termed the "vertical" polar and the second polar will be termed the "horizontal" polar, although it must be understood that the vertical direction is one of any possible directions of the first polar; the second polar is however located at a $\pi/2$ radians angle relative to the vertical polar, and therefore must be horizontal if the first polar is vertical.

A non-polarizing beam splitter 18 acts as the interferometer input plane and intersects source beam 16 to form substantially identical, plane polarized probe and reference beams 20, 22 of indefinite length, as suggested by the dotted lines 20a, 22a. Source beam 16 is partially reflected and partially transmitted by beam splitter 18 without any effect on its polarization, so that probe and reference beams 20, 22 have polarizations which are both identical to each other and to that of the source beam 16.

The probe beam 20 is intersected by a test medium 24 which is to be probed for obtaining information thereon, through interferometry and as described in the "Background of the Invention" section of the specification. Assuming a perfect alignment of the interferometer, difference equal to phase difference $\Delta\phi_c(x,y)$, i.e. the interferometric phase, will be induced to the probe beam, for each transverse position (x,y), by the test medium 24, as a result of an intrinsic structural property thereof, or of an external IS perturbation thereon. The phase difference $\Delta\phi_c(x,y)$ is the information sought to be retrieved, which will allow computation of information on the intrinsic property or external perturbation.

Test medium 24 has no effect on the polarization of probe beam 20.

Reference beam 22 is intersected by a wave plate element 26, which will be described hereinafter, and then interferentially merges with probe beam 20 at a second non-polarizing beam splitter 28 which acts as the interferometer output plane, to form a single output beam 30, in which both probe and reference beams interfere with each other in a manner which will be detailed hereinafter.

A pair of reflecting surfaces (e.g. mirrors) 32, 34 are used in the probe and reference beams 20, 22 respectively, to modify the orientation of their associated beams. Mirror 32, probe beam 20 and test medium 24 form the probe arm of the interferometer; while mirror 34, reference beam 22 and wave plate element 26 form the reference arm of the interferometer.

Wave plate element 26 defines at least two principal (spatial) axes which transmit electromagnetic waves polarized along said axes, at different phase speeds. In this case, wave plate element 26 has its two principal axes oriented so as to be aligned with the respective horizontal and vertical polars of the reference beam 22, with one of the wave plate element principal axes being called the fast axis and being aligned with the vertical polar of the reference beam 22. This fast axis will induce a precise $+\pi/2$ radians phase difference to the vertical polar relative to the horizontal polar of the reference beam.

Wave plate element 26 is a passive element in the preferred embodiment, but a suitable active birefringent element placed in the probe or reference arm of the interferometer, which is used to convert the linearly polarized probe or reference beam passing through said element into a circularly polarized beam at the interferometer output plane, may be used.

A feasible but less desirable alternative would be to use a wave plate assembly for the conversion of plane to elliptical polarization of the probe or reference beam. If ellilptical polarization is used, the major and minor axes of the polarization ellipse (which characterizes this type of polarization) must align colinearly with the first and second polar axes of the alternate, plane polarized beam, at the output plane. Hence the wave plate assembly, in this instance, may contain components to ensure that said axial alignment is effected in the output plane of the interferometer.

Also, an electro-optic element with application of the appropriate bias voltages to produce a phase difference of $+N*\pi/2$ radians (N is any odd integer) between the vertical and horizontal polars of the reference beam may be used, such as a Kerr effect cell element or a Pockels cell. Also a photo-elastic modulator element with application of the appropriate stress fields internal to the modulator element may be used.

When probe and reference beams 20, 22 merge at the output beam splitter 28, interference will occur between the two beams according to their polarization, i.e. that the horizontal polars of the two beams will interfere with each other, while the vertical polars of the two beams will interfere with each other, while no interference occurs between the horizontal and vertical polars of the two beams. Single output beam 30 is thus formed of the interfering horizontal polars and of the interfering vertical polars of the probe and reference beams 20, 22.

A single polarizing beam splitter 36 intersects output beam 30 so as to accomplish polarized segregation of beam 30 along axes aligned with the vertical and horizontal polars. Indeed, polarizing beam splitter 36 will transmit the horizontal polars, while orthogonally reflecting along path 33' the vertical polars of output beam 30, so as to obtain a first interferogram at 33 comprising the vertical polars and a second interferogram at 35 comprising the horizontal polars. A mirror 38 is preferably provided at a location to intersect the vertical polars beam portion 33' towards the location 33 where the first interferogram will be formed, e.g. parallel to the horizontal polar beam portion 35.

A possible alternative arrangement would be to replace the second beam splitter 28 with the polarizing beam splitter 36, and to accomplish both output beam generation and separation of the interferograms using a single element (36). This arrangement is useful if it is possible to place the cameras 40 and 42 close to said beam splitter, so that detection occurs without the output beams traveling large distances over separated paths. It is normally desirable to have the output beam components which generate the in-phase and quadrature interferograms propagate over a common optical path and to be segregated as closely as possible at the camera stages. This reduces the effect of differences in transverse alignment and possible differences in aberrations introduced by optical components in the separated beam paths.

The second interferogram 35 will thus be formed of the interfering horizontal polars of both the probe and reference beams 20, 22, and will give rise to the "in-phase" interferogram, termed so not because the horizontal polars of the probe and reference beams have no phase difference, but because the existing phase difference (or phase image) between said polars, being $\Delta\phi_c(x,y)$, is not perturbed by the action of the waveplate, (which adds an additional $\pi/2$ radians phase shift to all points of said phase image in the phase image formed from the vertical polars).

It is noted that the choice or assignment of the "in-phase" condition to the phase image formed from the horizontal polars is arbitrary. If we considered the vertical polars to be in-phase, the interferometric phase difference would still be considered to be (e.g. defined as) $\Delta\phi_c(x,y)$ but the horizontal polars would form an interferogram (e.g. conjugate quadrature interferogram) with a $-\pi/2$ radians offset added to the phase image formed from the vertical polars.

The first interferogram 33 will be formed of the interfering vertical polars of both the probe and reference beams 20, 22, and will give rise to the "quadrature" interferogram, which is termed so because of the $\pi/2$ radians phase offset induced to the vertical polar of the reference beam by the wave plate element 26.

Known imaging devices, e.g. cameras 40, 42, recover the images from the quadrature and in-phase interferograms, and store them in a data storing and processing unit, e.g. a computer (not shown).

In the apparatus 10, as described, each camera 40 and 42 is assumed to be equipped ahead thereof with an imaging system (such as focusing lens assemblies, 42A and 40A, respectively) which transfer images of the interference occurring at positions 33 and 35 to the camera array of light sensing elements. An absence of significant diffraction is assumed to occur between the test medium and the output plane positions 33 and 35. If this is not the case, the imaging systems 40A and 42A must be focused on the exit pupil plane of the interferometer (with aperture stop set to be located at the test medium).

With the images of the in-phase and quadrature interferograms 33, 35, it is possible to compute the phase difference $\Delta\phi_c(x,y)$, considering that the probe and reference beam intensity images $I_p(x,y)$ and $I_r(x,y)$ have previously been recovered and stored in the computer, as described in the "Background of the Invention" section. This is accomplished by means of shutters inserted in the probe and reference arms, that may individually be controlled to successively shutter the probe beam 20 and the reference beam 22 for independent reading of the beam intensity images.

The interferograms recorded by the imaging device or devices are read out into the digital computer, using an appropriate analog-to-digital conversion means if required. The camera or imaging device may be an analog or digital video camera, or a still frame analog or digital camera equipped with a charge coupled device (CCD) array, a photodiode array, a silicon vidicon target or similar discrete array structure for image detection.

The reconstruction of the interferometric phase, $\Delta\phi_c(x,y)$, is then achieved by means of a computer program based on the phase reconstruction algorithm which comprises a set of known computations and the end equations (1) to (4) detailed in the "Background of the Invention" section.

We now turn to the methods by which the reconstruction of an image of the interferometric phase is made using an apparatus based on a combination of the above components. The beams supplied by most radiation sources providing the interferometer source beam have stable intensity (x,y) images over time. The first step in the phase reconstruction method is the independent measurement of the images of the probe and reference beam intensity, in the absence of mutual interference between probe and reference beams. In situations where the probe and reference beams intensity images are not individually measurable, only the reference beam intensity image can be measured and the probe beam intensity image can be recovered later from the measured in-phase interferogram and the reference intensity image, by algebraic techniques.

The probe and reference beam intensity images formed by the apparatus of the invention have both horizontal and vertical polarization components, which are separated by the polarization splitting means leading to the imaging system. The probe and reference beams are individually shuttered in succession and images of their horizontal and vertical polarization components are recorded by the imaging system.

These images are either stored in computer memory or stored in the recording device medium, from which they are accessed by computational software used by a data processing device. The independent images of the probe and reference beam intensity remain valid for computational purposes for periods of minutes to hours past measurement, since most laser sources typically supply very stable beams over time periods of minutes to hours.

The next step in the phase image reconstruction procedure is to open both shutters and to form the interferograms. The imaging system then simultaneously records the images of the in-phase and quadrature interferograms.

The recorded interferograms are stored in computer memory and processed by a computer algorithm. First, the pixel-by-pixel (i.e. for each transverse coordinate (x,y)) value for the cosine interferogram $\cos(\Delta\phi_c(x,y))$, and likewise for the sine interferogram $\sin(\Delta\phi_c(x,y))$, are computed based on the images that were retrieved from the quadrature and in-phase interferograms 33, 35 and on equations (1) and (2), according to known methods of computing the pixel image value from the camera readout. If the measured quadrature interferogram from which the sine interferogram was extracted is in negative quadrature to the in-phase interferogram, all pixels of the resulting sine interferogram are multipled by −1. Then, equations (3) and (4) yield the phase difference, according to the sine and cosine signs. A value of zero is added to those interferometric phase image pixels which have corresponding positive sine and positive cosine interferogram pixel values; a value of $\pi/2$ is added to those interferometric phase image pixels which have corresponding positive sine and negative cosine interferogram pixel values; a value of $\pi$ is added to those interferometric phase image pixels which have corresponding negative sine and negative cosine interferogram pixel values; a value of $\pi/2$ is added to those interferometric phase image pixels which have corresponding negative sine and positive cosine interferogram pixel values. Thus, the phase reconstruction may be accomplished over the full angular interval from 0 to $2\pi$ radians.

The significant advances contributed by the present invention may now be enumerated. The invention is widely applicable to the detection of optical length and optical phase images in a material medium arising from intrinsic properties of said medium, and/or optical images induced in said medium from externally applied perturbations. Because of the precisely available electromagnetic anisotropy of the waveplate element used by the apparatus of the invention, a precise, transverse spatially invariant $\pi/2$ radians phase difference is applied between the horizontal and vertical polarization components which form the in-phase interferogram and the quadrature interferogram respectively. It should be understood, however, that this condition will be only true provided that the test medium probed by the interferometer probe beam exhibits no significant birefringence or anisotropy at the probe beam wavelengths. If the test medium exhibits a significant spatially invariant birefringence, a constant, spatially invariant error will be introduced into the probe beam phase relation between horizontal and vertical polars. Such an error may be compensated by introducing a homogeneous slab of material with matched optical transmission and birefringence to that of the test medium into the reference arm of the interferometer. Finally, if the test medium imparts a spatially uniform rotation of the probe beam polarization, this rotation effect may be compensated by inserting a polarization rotating element into either the probe or the reference arm of the interferometer as needed, to ensure that any applicable alignment relationship between polar axes and axes of polarization at the output plane is satisfied.

However, the method is tolerant to orientational differences in refractive index of the test medium at relative levels of up to 5%. Therefore, the inspection of weakly birefringent media is not excluded. Furthermore, both conventional and quadrature interferograms are formed simultaneously in time: there is no delay in image recording and no possibility that a phase error could arise due to a drift or change in the alignment of the interferometer optical components between the recordings of the in-phase and quadrature interferograms. In addition, the $\pi/2$ radians optical phase difference imposed by the wave plate element between the orthogonal polarization components in the propagating probe or reference beam arriving at the output plane is highly insensitive to all mechanical vibrations and accidental geometrical misalignments which equally affect both polarization states contained in the reference beam and probe beams. The wave plate is mounted as a fixed element with no moving parts, and is approximately an order of magnitude less expensive to purchase than the electro-optical, mechanical or piezo-electric apparatus used by the prior art.

The apparatus of the present invention is advantageous over the Smythe and Moore apparatus, briefly described in the "Background of the Invention" section. To more clearly illustrate the differences between the two apparatuses and attendant disadvantages of the Smythe/Moore embodiment, reference is made to FIG. 2, which schematically shows the Smythe/Moore apparatus 100 as adapted to an interferometer of the Mach-Zender design. It can be seen that the Smythe/Moore apparatus 100 comprises a radiation source 102 and a polarizer 104 which form a source beam 106 plane polarized so as to be oriented at $\pi/4$ radians relative to the horizontal and vertical polars, which vectorially form the polarized source beam 106. Beam 106 is splitted into substantially identical probe and reference beams 108, 110 by a non-polarizing beam splitter 112, to form distinct probe and reference arms. The probe beam intersects the test medium 114 and a first and a second polarization rotator elements (PRE) 116, 118 located upstream and downstream, respectively, of test medium 114; while the reference beam 110 is reflected by mirror 115 and intersects a third and a fourth PREs 120, 122. The first and third PREs 116, 120 rotate the probe and reference beams 108, 110, respectively, by an equal +/−π/4 radians value, so that the probe beam 108 be aligned along either one of the horizontal and vertical polar (e.g. the horizontal polar) and the reference beam 110 be aligned along the polar orthogonal to the one along which probe beam 108 is aligned (e.g. the vertical polar), so that the polarization axes of the probe and reference beams 108, 110 be oriented along distinct orthogonal vectorial polar components. The second and fourth PREs 118, 122 rotate the probe and reference beams of an equal +/−π/4 radians value, so that the probe and reference beams 108, 110 remain orthogonally polarized relative to each other.

After intersecting element 118, the probe beam 108 is reflected against mirror 123, to hit a second non-polarizing beam splitter 124.

Beam splitter 124 combines probe and reference beams 108, 110 and separates the two beams into a first and a second divergently oriented distinct output beams 126, 128 which are substantially identical, being formed from both the probe and reference beams 108, 110 that do not interfere with each other, since they are orthogonally polarized relative to each other at this plane. Thus, each output beam 126, 128 is formed of two distinct, non-interfering probe and reference beam components.

First output beam 126 is directed through a first polarizing beam splitter 130, which has an axis of polarization allowing in-phase interference to occur between the probe and reference beam components of first output beam 126, i.e. the polar components of the probe and reference beams which vectorially project along said axis, interfere with each other, to form the in-phase interferogram at 132.

Second output beam 128 is directed through a quarter wave plate 134 which causes a π/2 phase difference to be produced along the beam axis of propagation between the probe and reference beam polar components of second output beam 128. Beam 128 is then directed through a second polarizing beam splitter 136, which has an identically oriented polarization axis to that of 130, which allows interference to occur between the components of the phase shifted polars of the probe and reference beams which project vectorially along said axis, to form the quadrature interferogram at 138.

Figure 2:
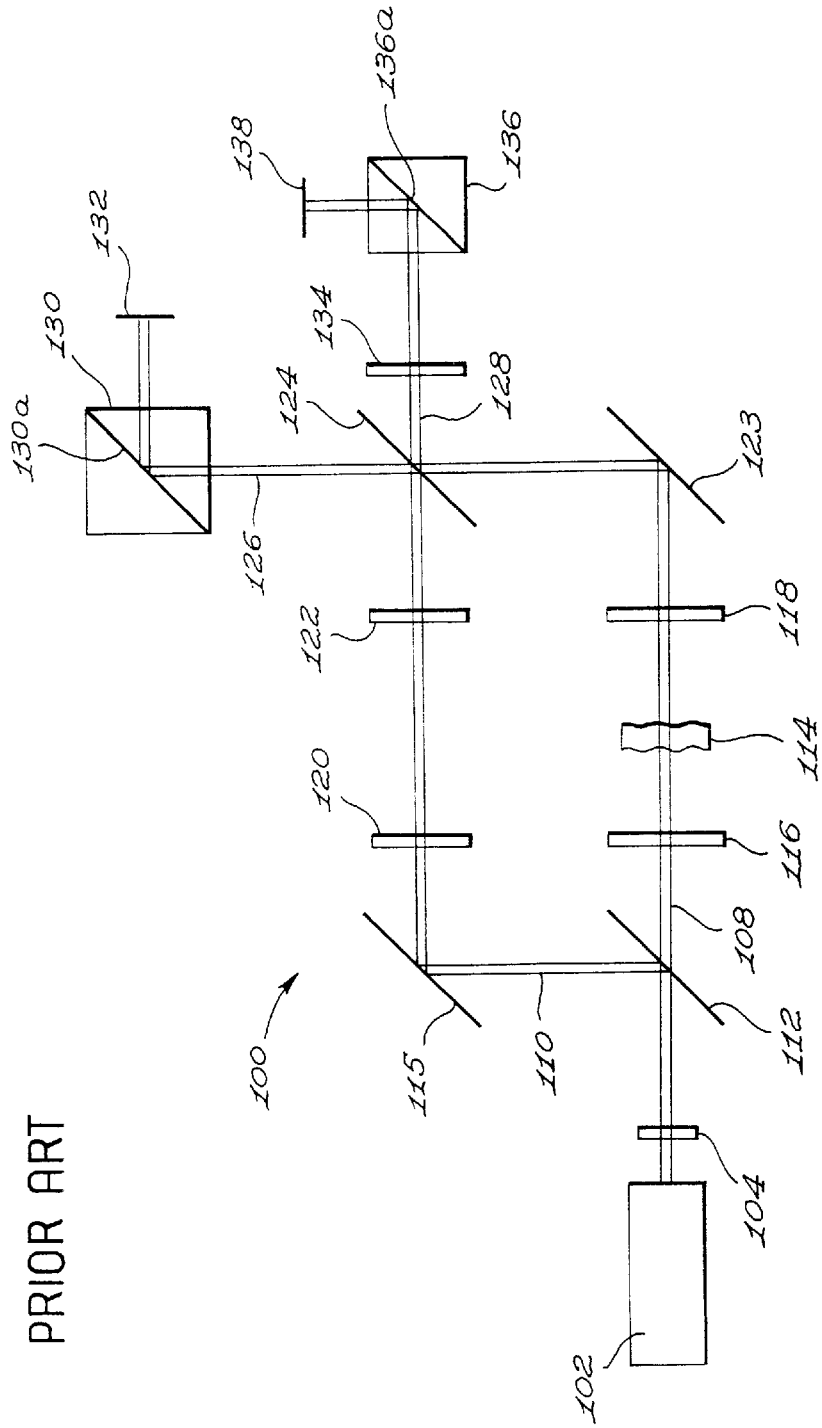
FIG. 2 schematically shows an interferometric apparatus according to the Smythe and Moore prior art apparatus.

The disadvantages of the Smythe and Moore apparatus may now be highlighted. First, the Smythe/Moore apparatus 100 generates in-phase and quadrature interferograms 132, 138 in what are, in fact, two separate interferometer stages, albeit with partially overlapping probe and reference paths. The identification of this design as two separate interferometer stages is clear from the fact that although there is a single radiation source and input plane, the in-phase and quadrature interferograms generated by the apparatus are formed at two physically separated planes 130A and 136A (as shown in FIG. 2) where mutual probe/reference beam interference occurs. Two distinct probe and reference beam paths are thus used for the interferometers forming in-phase and quadrature interferograms, and two separate cameras with their individual imaging systems. It is thus more likely that errors arising from differences in transverse (x,y) optical alignment or transverse abberotions between probe and reference beams in the separate interferometer systems forming the in-phase and quadrature interferograms could occur.

The apparatus of the present invention, by contrast, produces in-phase and quadrature interferograms in a single interferometer stage. Both in-phase and quadrature interferograms are formed from polarization components of the probe and reference beams where said beam components trace spatially identical paths (relative to each other) through each respective arm of the interferometer. Hence, any possible contribution due to transverse mis-alignment of said beam polarization components relative to each other within the interferometer stage is eliminated. Furthermore, past the output plane, said beam components may be constrained to follow an entirely common optical path before being separated by the polarizing beam splitter detected by the cameras, thus minimizing any errors due to transverse misalignments or optical aberrations of said beam components relative to each other. Therefore, the present invention simplifies the Smythe' & Moore apparatus, while substantially increasing the precision level of the generated interferograms, in a fashion that produces unexpectedly advantageous results.

A second defect of the Smythe and Moore design is the use of polarization rotation to produce mutual probe and reference beam interference, in conjunction with separated output planes to form in-phase and quadrature interferograms. Such a design requires a complex apparatus with a significantly larger number of expensive and adjustable optical parts compared to the present apparatus. The Smythe and Moore apparatus as reported used three polarizing beam splitters (although only two are shown in the simplified version of FIG. 2), and four waveplates (five are shown in FIG. 2, but wave plates 122, 118 could be a single wave plate located beyond non-polarizing beam splitter 124), to achieve what is accomplished by the apparatus of the present invention with a single waveplate element 26 and a single polarizing beam splitter 32. If one takes into account, furthermore, the image acquisition method used by the Smythe and Moore design (which is separate from the issue of interferogram formation), the complexity and expense of this prior art design are very greatly compounded. Smythe and Moore reported the use of four synchronised video cameras (although only two would be used in the simplified version shown in FIG. 2), with an image subtraction operation applied between pairs of images recorded at each of the polarizing beam splitter elements in the design. The apparatus of the present invention requires as little as one video camera, with an external imaging system of the appropriate design.

It can be clearly seen therefore, that the present invention has far greater simplicity, ease of alignment, freedom from transverse alignment (differential) errors between separated output beams, and lower cost of construction, than the Smythe and Moore apparatus.

An important advantage of the apparatus according to the present invention over most prior art apparatuses is that the phase imaging is accomplished faster, since both the in-phase and quadrature interferograms are formed simultaneously, with the attendant advantages. Although this advantage is not shared with most prior art devices, the Smythe and Moore apparatus does form simultaneous interferograms.

It is understood that any modifications that do not deviate from the scope of the present invention, are considered to be included therein.

For example, the invention is applicable under wide electromagnetic spectral band conditions, provided some external means of separating the spatial interferograms formed at different wavelengths is available. Wide band quarter wave plates, based on mica film construction, operate successfully over wide ranges of wavelengths in the visible range and in the near infrared, and reflecting eighth wave plates based on this material may be constructed. The spatial interferograms formed by such a wide band interferometer may be detected over multiple optical band widths simultaneously in time, using sets of optical interference filters, for example, or other suitable dispersive optical elements, such as monochromators.

In FIG. 1 the source 12 is shown to be equipped with a polarizer 14. While this is indeed the most convenient arrangement, it is also possible to use an intrinsically plane polarized source of radiation, such as a helium/neon laser, with no external polarizing element. Intrinsically plane polarized helium/neon laser sources may be obtained in compact, cylindrical housings, with the axis of beam propagation oriented parallel to the cylindrical axis of the housing. The axis of polarization of such a source may thus be varied, in the plane perpendicular to the axis of propagation, by rotating said source housing about its cylindrical axis.

In FIG. 1 and in the present specification, probe beam 20 is shown to be fully transmitted through test medium 24, but it is understood that it could also be fully reflected, or partially transmitted and partially reflected, as described in the "Background of the Invention" section, with associated alternate designs of apparatus 10.

Also, wave plate element 26 is shown to transmit reference beam 22 in its entirety, but it is understood that other wave plate assemblies may perform the equivalent function to the quarter wave plate 26. For example, mirror 34 and wave plate 26 could be removed and replaced with a reflecting eighth wave plate which would simultaneously function as a wave plate element and beam steering device. By extension, it is understood that any wave plate means which provides the required circular or elliptical polarization of the beam 22 at the second beam splitter 28 (with all axial alignment requirements met in the case of elliptical polarization supplied by the assembly) are admissible. Such wave plate assemblies could be constructed of optically reflective as well as transmissive elements, include polarization rotating elements (if required to rotate the axes of elliptical polarization for interference (along polar axes of the alternate linearly polarized beam, at the output plane) or any combinations thereof which provide said required polarization of beam 22 at the second beam splitter 28.

Concerning the polarizing beam splitter 36, it is understood that it may reflect either one of the horizontal and the vertical polars, while transmitting the other, wherein each polarized field component of the output beam has a separate optical path. Also, alternate devices are envisioned, within the scope of the present invention, for accomplishing polarized segregation of output beam 30 according to the horizontal and vertical polars.

For example, a possible alternative implementation of a polarized segregation would be a combination of beam splitting elements combined with polarizers, to accomplish the splitting by partial transmission (of both polarizations equally) of the output beam of the interferometer into two separate optical paths, with a linear polarizer aligned in the path of each of the separated beams to select the horizontal and vertical components individually. To detect images of the separated interferograms, two separate imaging devices may be used and aligned in the beam paths separated by the beam splitter. Each of these imaging devices must be equipped with appropriate image transfer elements to form an interferogram/image at each of the cameras or imaging devices. A means of precise image registration between in-phase and quadrature interferograms may be provided by aligning a reticle target in the output plane of the interferometer, or at some point conjugate thereto.

It is also possible, as a second alternative, to use a system of beam steering optical elements, to align the images from the polarization separated beams transmitted by the polarization sensitive optics (which individually carry the in-phase and quadrature interferogram information) side-by-side on the detection aperture of a single image detection device or camera. The single camera thus detects simultaneously in time, both the in-phase interferogram formed by the horizontal polarization components and the quadrature interferogram formed by the vertical polarization components.

The polarizing beam splitter can be a polarizing beam splitter cube.

Apparatus 10 shows the wave plate element 26 to be located in the reference arm of the interferometer, whereby a negative quadrature interferogram is recovered. It is understood that the wave plate element 26 could alternately be located in the probe arm of the interferometer, whereby the interferogram formed from the vertical polars would be in positive quadrature to the interferogram formed from the horizontal polars, and thus the positive quadrature interferogram would be recovered.

Up to now, the wave plate element 26 has been described as producing a $-\pi/2$ or $+\pi/2$ radians phase difference between the vertical and horizontal polars of either the probe or reference beam; it is understood that the phase difference produced may be of any $N*\pi/2$ radians value, where N is an odd positive or negative integer.

The principles of the invention are also applicable to phase imaging interferometers in which the probe beam is directed through a bundle of optical fibers to the test medium and/or where the probe beam interacting with said test medium is directed to the output plane through a bundle of optical fibers. The reference beam may also be directed through a bundle of fibers between input and output planes.

The effect of the fiber bundle on the probe beam is to separate said beam into a parallel two dimensional array of guided beam filaments which propagate in the individual fibers of the bundle. Each fiber is terminated in the test medium on the end opposite the input plane. Said test medium must contain a reflecting surface which returns the probe radiation from the test medium to the output plane of the interferometer. The probe beam filament which propagates in each individual fiber samples a small area of the test medium, and returns phase shift information from that localized area only. The phase shift information averaged over a single fiber thus forms an individual picture element or pixel of the total phase image formed in the interferometer from all of the fibers in the bundle, which distributes the phase image information in the transverse directions (x,y).

The invention may be implemented by locating the wave plate assembly, in the probe arm of said fiber bundle interferometer, between the input plane and the reflective end of said fiber bundle. Since the probe radiation is reflected from said reflective end of said bundle, and the probe beam passes twice through said wave plate, any wave plate assembly supplying a circularly polarized probe beam at the interferometer output plane must consist of an eighth wave plate. The wave plate assembly may alternatively be placed in the reference arm of the interferometer. Finally, a polarizing beam splitter which intercepts the superimposed output beams downstream of the output plane is used to separate the orthogonally polarized output components giving the in-phase and quadrature interferograms. Phase correction is applied to each fiber 'pixel' of the image.

The principles of the invention are applicable also to phase imaging using holographic interferometry. A holographic interferometer has an optical configuration of the type specified earlier for the generalized phase imaging interferometer stage, but with two additional optical requirements which must be satisfied for successful hologram recording as required by the holographic method. These requirements are: (i) the reference beam interfering at the output plane must be highly collimated and have nearly planar wave fronts; (ii) the reference beam must superimpose with the probe beam at a tilt angle of several degrees, (where the tilt angle is defined as the angular deviation of the slopes of the tangents to the wavefronts intersecting the output plane at the central axes of the probe and reference beams). A medium in which the hologram is recorded, called the holographic recording medium, must be placed at or external to the output plane of the interferometer. The external imaging system must have as its object the holographic recording medium (which must be thinner than the depth of focus of the imaging system) and said external imaging system must transfer an image or images of said medium to a camera or cameras. A set of spatial filters must be incorporated into said imaging system to spatially select the image of the appropriate order formed by the hologram when said hologram is illuminated with a combination of the superimposed reference beam and probe beam from the interferometer, with a test object present in the probe arm of the interferometer.

In the usual holographic measurement method, a hologram of a reference medium is first measured, where said hologram, when illuminated by a plane wave, reconstructs an image, called the reference medium phase front image, which is the image of the probe beam wavefront that results when a collimated probe beam is transversely phase shifted by interaction with said reference medium. The reference medium recorded hologram is then placed either in the output beam path or in the output plane of the interferometer where it is illuminated by the interferometer probe and reference beams. When a test medium is present in the probe arm of the interferometer, the hologram illuminated by said interferometer probe and reference beams forms an interferogram at the camera, where the phase of said interferogram is equal to the difference between the reference medium phase front image, and the wave front of the probe beam at the hologram plane. The interferogram so formed in the holographic interferometer is proportional to the cosine of the phase difference between the reference medium phase front image (as recorded in the hologram), and the phase front of the interferometer probe beam (at the hologram medium) produced in the presence of a test medium other than the reference medium. Said interferogram is called an in-phase differential interferogram.

The principles of the invention may be used to generate an interferogram in quadrature with said in-phase differential interferogram, at all image points. This is achieved in the holographic interferometer by using plane polarized radiation as the source beam with the axis of linear polarization oriented in a plane orthogonal to the source beam axis of propagation, and with orientation of said polarization axis at an angle of $\pi/4$ with respect to the orthogonal fast and slow axes of a waveplate element placed in the probe beam path, of the interferometer. Said waveplate element is selected to induce a $\pi/2$ phase shift between horizontal and vertical probe beam polars at the output plane. The horizontal polars of the output beam illuminate the hologram of the reference medium and cause an in-phase differential interferogram to form at a camera. The vertical polars of the output beam illuminate the hologram of the reference medium and cause a quadrature differential interferogram to form at the same camera or a separate camera from that used to record the in-phase differential interferogram. The differential interferogram which forms from the vertical polars is in quadrature at all image points (x,y) with the in-phase differential interferogram formed from the horizontal polars.

An essential feature of this embodiment of the invention using a holographic interferometer is that the hologram itself be recorded in a medium which does not significantly alter the polarization states of the beams propagating through it (or reflected at it, if a reflective recording medium is used). An optically (or dielectrically) isotropic recording medium will satisfy this requirement, as will a medium which records an equal holographic intensity for radiation of polarization collinear with either the vertical or horizontal polars of the interferometer beams. The hologram should be recorded with a geometry as close as possible to that used for interferometric measurements on test media other than the reference medium.

The elements of the invention may be implemented in a number of phase imaging interferometer stages of different geometrical configurations according to known prior art devices. These prior art devices may indeed be modified to become operational according to the objects of the present invention. These embodiments are presented hereinafter, showing only the interferometer stages of the different embodiments.

Figure 3:
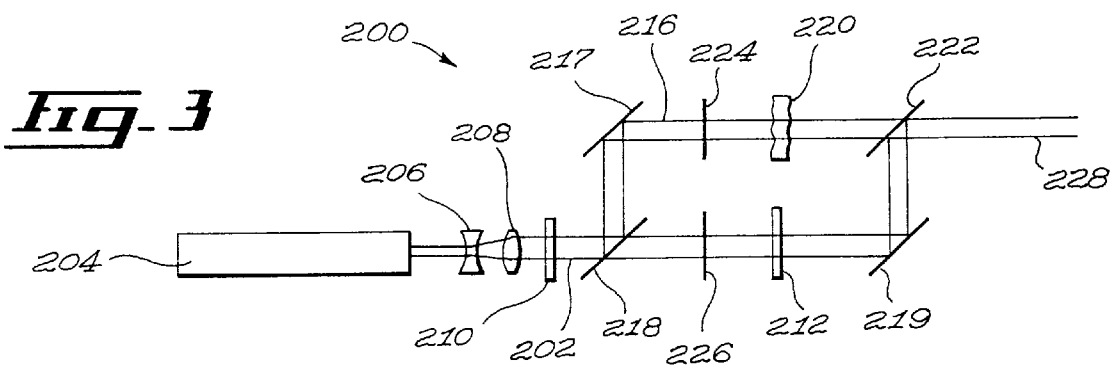
FIGS. 3, 4 and 5 schematically show implementations of the present invention into the interferometer stages of a Mach-Zehnder interferometer, a Twyman-Green interferometer and a Fizeau interferometer, respectively.

FIG. 3 schematically shows the interferometer stage of a Mach-Zehnder interferometer apparatus 200, in which the interferometer source beam 202 is obtained from a Helium/Neon laser 204, equipped with beam expanding and collimating optics 206 and 208 and is plane polarized by polarizer element 210 with the source beam axis of polarization aligned in the plane perpendicular to the axis of propagation of the source beam 202, and in said perpendicular plane, producing an angle of polarization of $\pi/4$ radians (in the reference beam) with respect to the fast and slow axes of a quarter wave plate 212 which is placed in the path of the reference beam 214. The polarized source beam 202 is split into probe and reference beams 216, 214 respectively, by a non-polarizing beam splitter 218, which thus establishes the input plane of the apparatus 200. Probe beam 216 is deflected by mirror 217 before intersecting test medium 220, while reference beam 214 is deflected by mirror 219 only after having intersected wave plate 212. The probe arm contains the test medium 220 through which the probe beam 216 propagates, while the reference beam 214 propagates directly to a second non-polarizing beam splitter 222. At the second beam splitter 222, the probe beam 216 transmitted by the test medium 220 interferentially merges with the reference beam 214. The second beam splitter 222 thus establishes the output plane of the interferometer. In this embodiment the input and output planes occupy separate spatial locations, and both the probe and reference beams 216, 214, pass unidirectionally between the input and output planes.

Selectively operable shutter elements 224 and 226 are placed in the paths of probe and reference beams 216, 214 respectively, to permit measurement of the individual beam intensities images in the absence of mutual interference. The quarter wave plate 212 placed in the reference arm of the interferometer provides a phase shift of $\pi/2$ between the vertical and horizontal polars of the reference beam 214 at said second beam splitter, which is a state of circular polarization of said beam at said second beam splitter.

Superposition at the output plane 222 of the probe and reference beams 216, 214, will allow formation of in-phase and quadrature spatial interferograms, from the horizontal and vertical polars, respectively.

The output beam 228 (downstream of beam splitter 222) is then further directed through a polarizing beam splitter and an imaging system, not shown but as already as described for the general embodiment of the invention in FIG. 1.

Figure 4:
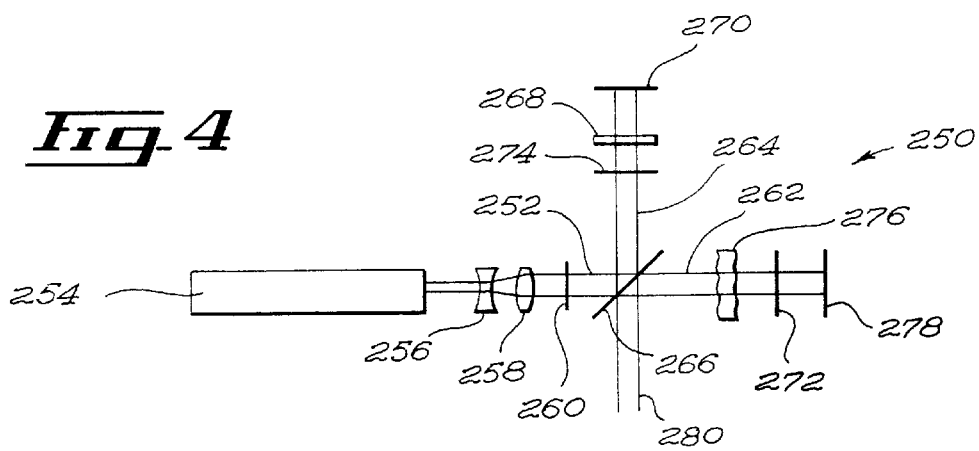

Another possible embodiment of the interferometer stage, is schematically shown in the apparatus 250 of FIG. 4, based on a Twyman-Green interferometer design. The source beam 252 is supplied by a Helium/Neon laser 254 equipped with beam expanding and collimation elements, 256, 258, and is plane polarized by polarizer element 260, with the source beam axis of polarization aligned in the plane perpendicular to the axis of propagation of the source beam. Probe and reference beams 262 and 264 are divergently separated by a pellicular non-polarizing beam splitter element 266, which establishes the interferometer input plane. The reference beam 264 is directed through a waveplate element 268 placed between the input plane 266 and the reference end mirror 270. The axis of polarization of the reference beam 264 is oriented, in the plane perpendicular to said beam axis of propagation, at an angle of $\pi/4$ radians with respect to the fast and slow axes of the wave plate 268 which is placed in the reference beam path. The probe and reference beams 262, 264 are intersected by selectively operable respective shutters 272, 274 respectively, to allow independent measurement of the probe and reference beam intensity images, in the absence of mutual interference. The reference beam 264 propagates to an end mirror 270, while the probe beam 262 propagates through the test medium 276 to its respective end reflecting mirror 278. The test medium 276 is located between the beam splitter 266 and the probe mirror 278, while shutter 272 is located between test medium 276 and mirror 278. Since both probe and reference beams 262, 264 are reflected by their respective end mirrors 278, 270 and recombined at the central beam splitter 266, this latter element thus establishes the position of the output plane of the interferometer. In the Twyman-Green design, the input and output planes occupy effectively spatially coincident locations, and a double traversal of the paths between the beam splitter 266 and the end mirror 270 is made by the reference beam 264. The waveplate element 268 is arbitrarily placed in the reference beam 264 path. Since the reference beam 264 propagates through this element 268 twice, the waveplate is cut as an eighth wave plate (over the interferometer wavelength range) and the waveplate provides a circular polarization of said beam 264 characterized by (or corresponding to) a total phase shift of $\pi/2$ between the horizontal and vertical polars of the reference beam 264 arriving at the output plane 266. The output beam 280 is then further directed through a polarizing beam splitter and an imaging system, not shown but as described for the general embodiment of the invention.

In the embodiment shown in FIG. 4, the waveplate element 268 fully transmits the interferometer reference beam with two passes thereof through the waveplate element 268, and converts the linear polarization of said reference beam 264 arriving thereat to a circular polarization of said beam downstream thereof.

Figure 5:
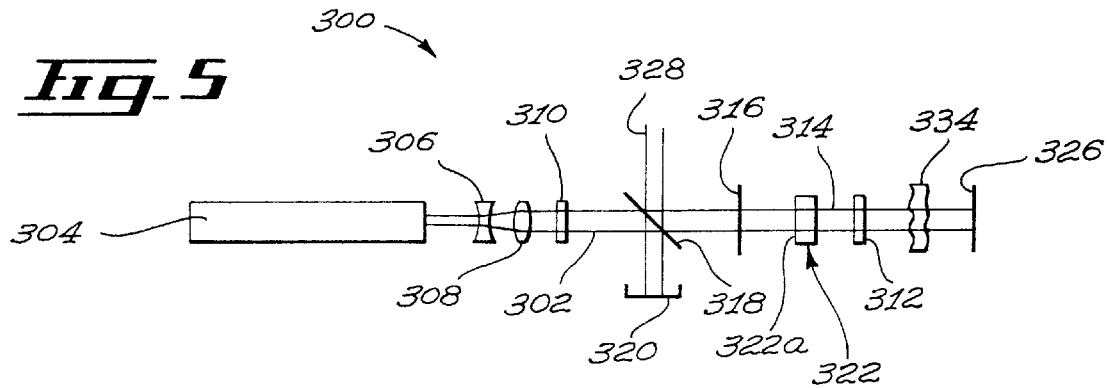

The invention is also adaptable to the Fizeau type interferometer stage, in an apparatus 300 which is schematically shown in FIG. 5. The source beam 302 is assumed to be provided by a Helium/Neon laser 304 equipped with beam expanding and collimation optical elements 306, 308 and is plane polarized by polarizer element 310, with the source beam axis of polarization aligned in the plane perpendicular to the axis of propagation of the source beam, and in this perpendicular plane, at an angle giving rise to an angle of linear polarization in the probe beam 314 of $\pi/4$ radians with respect to the fast and slow axes of a wave plate 312 which is placed in the path of probe beam 314. A shutter 316 is placed in the source beam 302 path. The source beam 302 propagates through a non-polarizing beam splitting element 318, at which half of the source radiation intensity is transmitted and the other half is divergently reflected and absorbed by a beam stop 320. The source beam transmitted by this beam splitter 318 propagates until it encounters the front surface 322a of a second non-polarizing beam splitter element 322 which reflects 50% of the incoming source radiation and thus causes it to counter propagate along the axis of the incoming source beam. The remaining 50% of the seen that the second beam splitter reflective surface 322a establishes the input plane of the interferometer. The probe beam propagates through the wave plate element 312 and the test medium 324 and is reflected by an end mirror 326, from where it then retraces its incident path. The probe beam 314, when returned to the front surface 322a of the second beam splitter element 322 is superimposed with the reference beam. The length of the probe arm is twice the distance from the input plane 322a to the end mirror 326. Hence the front surface 322a of the beam splitter element 322 locates both the input and output planes of the interferometer, and the respective planes occupy effectively coincident spatial locations, to within a small possible error due to potential angular misalignment of the end mirror. In the general Fizeau design shown in FIG. 5, the physical length of the reference arm is zero. The probe beam exiting the interferometer at incident surface 322a is recombined with the reference beam to form the output beam 328, which is reflected away from the incoming source beam at the first beam splitter element 318. However, the waveplate element 312 can only be placed in the probe arm, since there is no physical reference arm in this embodiment, and since the probe beam 314 makes a double pass through the waveplate element 312 between input and output planes 322a and 322a, the wave plate element 312 is cut as an eighth wave plate so that the two passes of the probe beam therethrough confer the total $\pi/2$ radians phase difference required, and a corresponding state of circular polarization to the beam.

The wave plate element can be a quarter wave plate or an eighth wave plate, depending on the design of the interferometer which is used. Indeed, if the reference (or probe) beam passes only once through the waveplate element, like in the embodiment shown in FIG. 1, then a quarter wave plate will be used. However, if the beam passes twice through the wave plate element, like in the embodiment of FIG. 4, then an eighth wave plate will be used. It will be understood by the person skilled in the art that a suitable wave plate element must be chosen so as to provide the required phase shift difference per beam pass through the element, depending on the particular design of interferometer.

I claim:

1. An interferometric phase imaging apparatus for optically probing a suitable substantially non-birefringent test medium of optically varying length, comprising:

a radiation source providing a source beam along an axis of propagation;

a polarizer for plane polarizing said source beam along a single polarizing axis, the electric field of said beam being vectorially composed of a first and a second electric field polar components orthogonal to each other of equal magnitude and both oriented in a plane perpendicular to said axis of propagation, said polarizer thus transforming said source beam into a plane polarized source beam;

a first non-polarizing beam splitter, for separating said plane polarized source beam into plane polarized probe and reference beams, with the test medium intersecting said probe beam;

a wave plate element intersecting a selected beam among either one of said probe beam and said reference beam, said wave plate element modifying the phase of said selected beam first polar component so as to confer a phase difference of $N*\pi/2$ radians between said first and second polar components, where N is any odd signed integer;

a second non-polarizing beam splitter, which interferentially combines said probe beam and said reference beam into an output beam having first and second polar components, in which the first polar components of said probe beam and said reference beam interfere with each other, but distinctly of the second polar components of said probe beam and said reference beam, which also interfere with each other;

a single polarizing beam splitter accomplishing polarized segregation of said output beam according to both said first and said second polar components so as to obtain a first interferogram comprising the first polar components of said output beam and a second interferogram comprising the second polar components of said output beam; and image recovering means, for recovering the images of said first and second interferograms.

2. An apparatus as defined in claim 1, wherein said wave plate element is an electrooptic element which comprises an external power source for inducing a voltage thereon for obtaining said phase shift of $N*\pi/2$ radians between the first and second polars of said selected beam.

3. An apparatus as defined in claim 2, wherein said wave plate element is a Kerr effect cell.

4. An apparatus as defined in claim 2, wherein said wave plate element is a Pockels cell.

5. An apparatus as defined in claim 1, wherein said polarizing beam splitter is designed to transmit the first polar component of the output beam while reflecting the second polar component thereof.

6. An apparatus as defined in claim 1, wherein said polarizing beam splitter is designed to transmit the second polar component of the output beam while reflecting the first component thereof.

7. An apparatus as defined in claim 1, wherein said radiation source is a laser.

8. An apparatus as defined in claim 1, wherein said wave plate element is a quarter wave plate.

9. An interferometric phase imaging apparatus for optically probing a suitable substantially non-birefringent test medium of optically varying length, comprising:

a radiation source providing a source beam along an axis of propagation;

a polarizer for plane polarizing said source beam along a polarizing axis, the electric field of said beam being vectorially composed of a first and a second electric field polar components of equal magnitude orthogonal to each other and both oriented in a plane perpendicular to said axis of propagation, said polarizer thus transforming said source beam into a plane polarized source beam;

a non-polarizing beam splitter, for separating said polarized source beam into plane polarized probe and reference beams, with the test medium intersecting said probe beam;

a wave plate element intersecting a selected beam among either one of said probe beam and said reference beam, with said wave plate element modifying the phase of said selected beam first polar component so as to confer a phase difference of $N*\pi/2$ radians between said first and second polar components, where N is any odd signed integer;

at least one reflective element intersecting at least either one of said probe beam and said reference beam, whereby said probe beam and said reference beam are redirected to said non-polarizing beam splitter and are interferentially combined thereat into an output beam having first and second polar components, in which the first polar components of said probe beam and said reference beam interfere with each other, but distinctly of the second polar components of said probe beam and said reference beam, which also interfere with each other;

wherein said phase difference applies at said output beam, after the beam has passed twice through said wave plate element, and downstream of said wave plate, element and upstream of and at the first mentioned beam splitter;

further including a single polarizing beam splitter accomplishing polarized segregation of said output beam according to both said first and said second polar components so as to obtain a first interferogram comprising the first polar components of said output beam and a second interferogram comprising the second polar components of said output beam; and image recovering devices, for recovering the images of said first and second interferograms.

10. An apparatus as defined in claim 9, wherein said wave plate element is an eighth wave plate.

11. An apparatus as defined in claim 9, wherein said polarizing beam splitter is a polarizing beam splitter cube.

12. A method for optically probing a suitable substantially non-birefringent test medium of optically varying length and obtaining information about the properties thereof by recovering the images of quadrature and in-phase interferograms with an interferometric phase imaging apparatus comprising a plane polarized radiation source, a first and a second non-polarizing beam splitters, a polarizing beam splitter, a wave plate element and imaging recovering means, said method comprising the steps of:

a) providing a polarized source beam with the radiation source along an axis of propagation, whereby the source beam is polarized along a polarizing axis, the electric field of said beam being vectorially composed of a first and a second electric field polar components orthogonal to each other and both oriented in a plane perpendicular to said axis of propagation;

b) splitting the beam with the said first beam splitter into plane polarized distinct probe and reference beams;

c) intersecting said probe beam with the test medium, and intersecting a selected beam among either one of said probe beam and said reference beam with the wave plate element, whereby the phase speed of the first polar of the selected beam is modified by $N*\pi/2$ radians, where N is any signed odd integer, relative to its second polar, by the wave plate element;

d) merging, at said second non-polarizing beam splitter, said probe beam and said reference beam into a single output beam so as to produce interference between the first polar components of said probe beam and said reference beam and a distinct interference between the second polars of said probe beam and said reference beam;

e) segregating said output beam according to its polarization with the polarizing beam splitter, wherein the first and second polar components of said output beam will be separated so as to allow distinct interferograms to be formed, whereby a quadrature interferogram will be formed from said first polar components and an in-phase interferogram will be formed from said second polar components; and f) recovering the images of the quadrature and in-phase interferograms with the image recovering means.

13. A method as defined in claim 12, further comprising, before step (a), the steps of independently recording and storing the images of at least the reference beam intensity, in the absence of mutual interference between said probe beam and said reference beam, for both said first and said second polars.

14. A method as defined in claim 12, further comprising, before step (a), the steps of independently recording and storing the images of both said reference beam and said probe beam intensity, in the absence of mutual interference between said probe beam and said reference beam, for both the first and the second polars.

15. A method for optically probing a suitable substantially non-birefringent test medium of optically varying length and obtaining information about the properties thereof by recovering the images of quadrature and in-phase interferograms with an interferometric phase imaging apparatus comprising a plane polarized radiation source, a non-polarizing beam splitter, a polarizing beam splitter, at least one reflective element, a wave plate element and imaging recovering means, said method comprising the steps of:

a) providing a plane polarized source beam with the radiation source along an axis of propagation, whereby the source beam is polarized along a polarizing axis, the electric field of said beam being vectorially composed of a first and a second electric field polar components orthogonal to each other and of equal magnitude and both oriented in a plane perpendicular to said axis of propagation;

b) splitting the beam with the said non-polarizing beam splitter into plane polarized distinct probe and reference beams;

c) intersecting said probe beam with the test medium, and intersecting a selected beam among either one of said probe beam and said reference beam with the wave plate element, whereby the phase speed of the first polar of the selected beam is modified by $N*\pi/2$ radians, where N is any odd signed integer, relative to its second polar, by the wave plate element;

d) intersecting with said at least one reflective element at least either one of said probe beam and said reference beam, whereby said probe beam and said reference beam are redirected to said non-polarizing beam splitter;

e) merging, at said second non-polarizing beam splitter, said probe beam and said reference beam into a single output beam so as to produce interference between the first polar components of said probe beam and said reference beam and a distinct interference between the second polars of said probe beam and said reference beam;

wherein said modified phase speed applies at said output beam, after the beam has passed twice through said wave plate element, and downstream of said wave plate element and upstream of and at the first mentioned beam splitter;

f) further including the step of segregating said output beam according to its polarization with the polarizing beam splitter, wherein the first and second polar components of said output beam will be separated so as to allow distinct interferograms to be formed, whereby a quadrature interferogram will be formed from said first polar components and an in-phase interferogram will be recovered from said second polar components; and g) recovering the images of the quadrature and in-phase interferograms with the image recovering means.

16. An interferometric phase imaging apparatus for optically probing a suitable substantially non-birefringent test medium of optically varying length, comprising:

an intrinsically plane polarized laser source providing a source beam along an axis of propagation for polarizing said source beam along a polarizing axis vectorially composed of a first and a second electric field polar components orthogonal to each other, of equal magnitude and both oriented in a plane perpendicular to said axis of propagation;

a first non-polarizing beam splitter, for separating said plane polarized source beam into plane polarized probe and reference beams, with the test medium intersecting said probe beam;

a wave plate element intersecting a selected beam among either one of said probe beam and said reference beam, said wave plate element modifying the phase of said selected beam first polar component so as to confer a phase difference of $N*\pi/2$ radians between said first and second polar components, where N is any odd signed integer;

a second non-polarizing beam splitter, which interferentially combines said probe beam and said reference beam into an output beam having first and second polar components, in which the first polar components of said probe beam and said reference beam interfere with each other, but distinctly of the second polar components of said probe beam and said reference beam, which also interfere with each other;

a single polarizing beam splitter accomplishing polarized segregation of said output beam according to both said first and said second polar components so as to obtain a first interferogram comprising the first polar components of said output beam and a second interferogram comprising the second polar components of said output beam; and image recovering devices, for recovering the images of said first and second interferograms.

17. An interferometric phase imaging apparatus for optically probing a suitable substantially non-birefringent test medium of optically varying length, comprising:

a radiation source providing a source beam along an axis of propagation;

a polarizer for plane polarizing said source beam along a single polarizing axis, the electric field of said beam being vectorially composed of a first and a second electric field polar components orthogonal to each other of equal magnitude and both oriented in a plane perpendicular to said axis of propagation, said polarizer thus transforming said source beam into a plane polarized source beam;

a first non-polarizing beam splitter, for separating said plane polarized source beam into plane polarized probe and reference beams, with the test medium intersecting said probe beam;

a wave plate element intersecting a selected beam among either one of said probe beam and said reference beam, said wave plate element modifying the phase of said selected beam first polar component so as to confer a phase difference of $N*\pi/2$ radians between said first and second polar components, where N is any odd signed integer;

a second non-polarizing beam splitter, which interferentially combines said probe beam and said reference beam into an output beam having first and second polar components, in which the first polar components of said probe beam and said reference beam interfere with each other, but distinctly of the second polar components of said probe beam and said reference beam, which also interfere with each other;

wherein said second beam splitter further accomplishes polarized segregation of said output beam according to both said first and said second polar components so as to obtain a first interferogram comprising the first polar components of said output beam and a second interferogram comprising the second polar components of said output beam; and image recovering devices, for recovering the images of said first and second interferograms.

* * * * *